United States Patent
Cui et al.

(10) Patent No.: US 12,411,876 B2
(45) Date of Patent: Sep. 9, 2025

(54) ANSWER INFORMATION GENERATION METHOD

(71) Applicant: BEIJING BAIDU NETCOM SCIENCE TECHNOLOGY CO., LTD., Beijing (CN)

(72) Inventors: Zhuangzhuang Cui, Beijing (CN); Bo Fu, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/747,415

(22) Filed: Jun. 18, 2024

(65) Prior Publication Data

US 2024/0411790 A1    Dec. 12, 2024

(30) Foreign Application Priority Data

Nov. 27, 2023 (CN) .......................... 202311596336.4

(51) Int. Cl.
  G06F 16/33    (2025.01)
  G06F 16/3329  (2025.01)
  G06F 16/334   (2025.01)
  G06F 16/353   (2025.01)
  G06F 40/186   (2020.01)
  G06F 40/30    (2020.01)

(52) U.S. Cl.
  CPC ...... G06F 16/3329 (2019.01); G06F 16/3347 (2019.01); G06F 16/353 (2019.01); G06F 40/186 (2020.01); G06F 40/30 (2020.01)

(58) Field of Classification Search
  CPC . G06F 16/3329; G06F 16/353; G06F 16/3347
  See application file for complete search history.

(56) References Cited

U.S. PATENT DOCUMENTS

2022/0121824 A1* 4/2022 Hu ........................... G06F 40/30
2022/0343082 A1* 10/2022 Lee .......................... G06N 5/02

* cited by examiner

*Primary Examiner* — Loc Tran
(74) *Attorney, Agent, or Firm* — Maschoff Brennan; Liang Huang

(57) ABSTRACT

A method is provided. The method includes: obtaining, in response to receiving a question text from a user, a semantic vector of the question text and event information related to a specific field; obtaining a plurality of candidate documents from a document library of the specific field based on at least two of the semantic vector of the question text, the at least one piece of argument information and the event category; determining quality evaluation information for each candidate document in the plurality of candidate documents based on the event category; and determining at least one target document from the plurality of candidate documents based on the quality evaluation information of each candidate document and a correlation between each candidate document and the question text, to obtain, based on the at least one target document, answer information used to answer the question text.

17 Claims, 5 Drawing Sheets

ANSWER INFORMATION GENERATION METHOD

CROSS REFERENCE TO RELATED APPLICATION

The present application claims priority to Chinese Patent Application No. 202311596336.4 filed on Nov. 27, 2023, which is incorporated herein by reference in its entirety.

TECHNICAL FIELD

The present disclosure relates to the technical field of artificial intelligence, in particular, to the fields of document retrieval, natural language processing, and large language models, and specifically, to an answer information generation method based on a large language model, an electronic device and a computer-readable storage medium.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

As a key technology in the field of natural language, document question answering has a wide application prospect, for example, in an intelligent customer service, a search engine, a blog system, and a local knowledge base in specific fields. The document question answering is, for example, in the financial field, document question answering usually used in vertical fields related to asset investment consultation and research report writing.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides an answer information generation method based on a large language model, an electronic device and a computer-readable storage medium.

According to an aspect of the present disclosure, there is provided an answer information generation method based on a large language model, including: obtaining, in response to receiving a question text from a user, a semantic vector of the question text and event information related to a specific field, wherein the event information includes an event category concerning the question text and at least one piece of argument information in the question text; obtaining a plurality of candidate documents from a document library of the specific field based on at least two of the semantic vector of the question text, the at least one piece of argument information and the event category; determining quality evaluation information for each candidate document in the plurality of candidate documents based on the event category; and determining at least one target document from the plurality of candidate documents based on the quality evaluation information of each candidate document and a correlation between each candidate document and the question text, to obtain, based on the at least one target document, answer information used to answer the question text.

According to another aspect of the present disclosure, there is provided an electronic device, including: one or more processors; and a memory storing one or more programs configured to be executed by the one or more processors, the one or more programs comprising instructions for: obtaining, in response to receiving a question text from a user, a semantic vector of the question text and event information related to a specific field, wherein the event information includes an event category concerning the question text and at least one piece of argument information in the question text; obtaining a plurality of candidate documents from a document library of the specific field based on at least two of the semantic vector of the question text, the at least one piece of argument information and the event category; determining quality evaluation information for each candidate document in the plurality of candidate documents based on the event category; and determining at least one target document from the plurality of candidate documents based on the quality evaluation information of each candidate document and a correlation between each candidate document and the question text, to obtain, based on the at least one target document, answer information used to answer the question text.

According to another aspect of the present disclosure, there is provided a non-transitory computer-readable storage medium, storing one or more programs comprising instructions that, when executed by one or more processors of a computing device, cause the computing device to perform operations comprising: obtaining, in response to receiving a question text from a user, a semantic vector of the question text and event information related to a specific field, wherein the event information includes an event category concerning the question text and at least one piece of argument information in the question text; obtaining a plurality of candidate documents from a document library of the specific field based on at least two of the semantic vector of the question text, the at least one piece of argument information and the event category; and determining at least one target document from the plurality of candidate documents based on the quality evaluation information of each candidate document and a correlation between each candidate document and the question text, to obtain, based on the at least one target document, answer information used to answer the question text.

It should be understood that the content described in this section is not intended to identify critical or important features of the embodiments of the present disclosure, and is not used to limit the scope of the present disclosure. Other features of the present disclosure will be readily understood with reference to the following description.

BRIEF DESCRIPTION OF THE DRAWINGS

The accompanying drawings show example embodiments and form a part of the specification, and are used to explain example implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described here, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms.

The embodiments of the present disclosure will be described below in detail with reference to the accompanying drawings.

Figure 1:
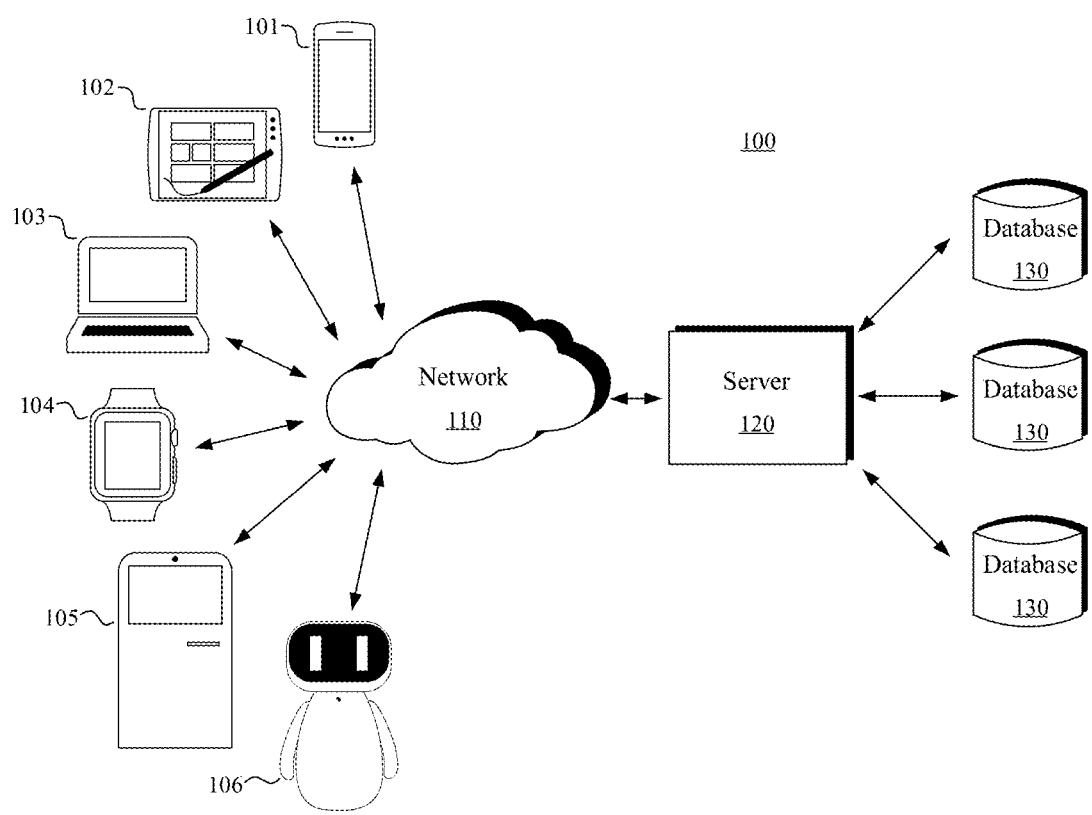
FIG. 1 is a schematic diagram of an example system in which various methods described herein can be implemented, according to some embodiments of the present disclosure.

FIG. 1 is a schematic diagram of an example system 100 in which various methods and apparatuses described herein can be implemented according to some embodiments of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more applications.

In some embodiments of the present disclosure, the server 120 can run one or more services or software applications that enable the above answer information generation method based on the large language model to be performed.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client devices 101, 102, 103, 104, 105, and/or 106 may sequentially use one or more client applications to interact with the server 120, to use the services provided by these components. It should be understood that various different system configurations are possible, and may be different from that of the system 100. Therefore, FIG. 1 is an example of the system for implementing various methods described herein, and is not intended to be limiting.

The user may use the client devices 101, 102, 103, 104, 105, and/or 106 to input a question text. The client device may provide an interface that enables the user of the client device to interact with the client device. The client device may also output information to the user via the interface. Although FIG. 1 shows only six client devices, those skilled in the art will understand that any number of client devices are supported in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software applications and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or WIFI), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, so that the various methods and apparatuses described according to the present disclosure can be applied.

Figure 2:
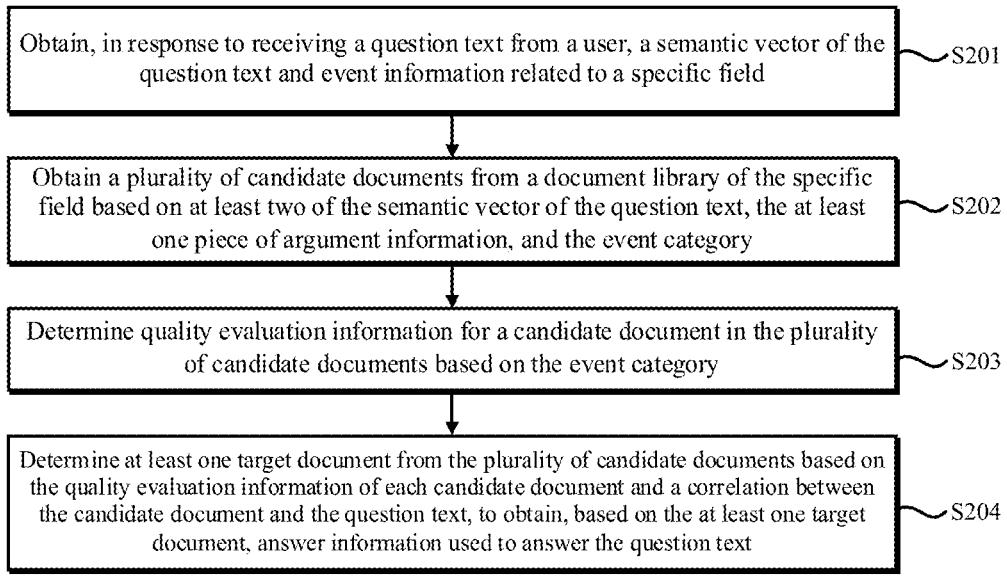
FIG. 2 is a flowchart of an answer information generation method based on a large language model according to some embodiments of the present disclosure.

According to some embodiments, as shown in FIG. 2, there is provided an answer information generation method based on a large language model, including the following steps:

Step S201: Obtain, in response to receiving a question text from a user, a semantic vector of the question text and event information related to a specific field, where the event information includes an event category concerning the question text and at least one piece of argument information in the question text.

Step S202: Obtain a plurality of candidate documents from a document library of the specific field based on at least two of the semantic vector of the question text, the at least one piece of argument information, and the event category.

Step S203: Determine quality evaluation information for each candidate document in the plurality of candidate documents based on the event category.

Step S204: Determine at least one target document from the plurality of candidate documents based on the quality evaluation information of each candidate document and a correlation between each candidate document and the question text, to obtain, based on the at least one target document, answer information used to answer the question text.

Therefore, event classification and argument extraction are firstly performed on a question text of a user to obtain multi-dimensional information of the question text; documents are recalled by comprehensively considering the multi-dimensional information such as a semantic vector, an event category, and argument information; and then the quality evaluation information corresponding to the event category is determined based on the event category of the question text, and a target document is determined from the recalled documents by comprehensively considering a correlation and the quality evaluation information, so that document recall accuracy of a document question answering system in a specific field is further improved.

In some embodiments, after the question text of the user is received, event classification in the specific field may be firstly performed on the question text to obtain the event category concerning the question text. For example, in the financial field, a question text input by the user may be used to inquire about a shareholder change event, and an event category of the question text is shareholder change.

In some embodiments, one or more event categories may be obtained for one question text.

In some embodiments, event categories at a plurality of levels may be obtained for one question text.

In some embodiments, event classification may be implemented based on a pre-trained text classification model. Multi-level event classification may be implemented based on pre-trained event classification models respectively corresponding to main categories. It may be understood that event classification may alternatively be implemented in another manner (such as text matching), and this is not limited herein.

In some embodiments, argument extraction may be performed on the question text at the same time. For example, in the financial field, a question text input by the user may be used to inquire about a shareholder change event, and then key arguments such as "shareholder's shareholding ratio" and "bond scale" may be extracted from the question text.

In some embodiments, an argument extraction model corresponding to a specific field may be obtained through training based on a deep learning framework by performing methods of part-of-speech tagging, named entity recognition, syntax analysis, etc. on the question text, and then argument extraction may be performed based on the model.

In some embodiments, rule-based, template-based, and machine learning-based methods may alternatively be used to perform argument extraction, and this is not limited herein.

In some embodiments, a document library in a specific field may be pre-built before document recall. First, a document may be parsed, so that document data in various formats is parsed into a plain text format for storage.

Taking documents in the financial field as an example, which mainly include three main categories of data: financial reports, research reports, and news and public sentiment. Listed companies usually publish financial reports in the form of PDF, which mainly contain content related to three financial statements, and mainly exist in documents in the form of tables. This requires that a document parsing module should have the ability to extract tables. For research reports, financial institutions and related professionals usually publish research trends on macroeconomics or listed companies in the form of PDF. Different from the document form of financial reports, the research reports have rich and diverse document elements, and have complex layout that often contains double columns, triple columns, etc. The use of commonly used PDF parsing tools may lead to garbled words and disordered sentences. News and public sentiment are usually published in the form of web page content, and therefore, an html parsing function needs to be fulfilled for document parsing.

Documents in the financial field may be parsed by using a document parsing module with the abilities of web page parsing, PDF parsing, document segmentation into columns, table extraction, etc. For a given financial document, first, the document is parsed to obtain paragraph text content in the document and store the paragraph text content in a plain text format. Then, basic structured fields of the document, such as a document source, a document author, a document release date, and a document title, are extracted, and the above basic structured fields are associated with index information of the document, and stored in a document library together with the document content in the plain text format.

In some embodiments, event classification and argument extraction may be further performed on the document content.

In some embodiments, similar to the method in which event classification and argument extraction are performed on the above question text, event classification and argument extraction may be performed on the document content, and one or more document event categories and one or more pieces of document argument information of the document content may be associated with the index information of the document, and stored together with the index information in the document library. Taking documents in the financial field as an example, there are a total of 10 main categories and 65 sub-categories of financial events in the financial field. Each category of financial event contains basic arguments such as an event name, an event subject, and an event date. In addition, each category of financial event further includes additional key arguments (for example, the event "shareholder change" contains "shareholder's shareholding ratio", and "bond default" contains "bond scale").

In some embodiments, a semantic vector of the document content may be further obtained.

In some embodiments, the document content may be directly input into a semantic understanding model, to obtain the semantic vector of the text content.

Figure 3:
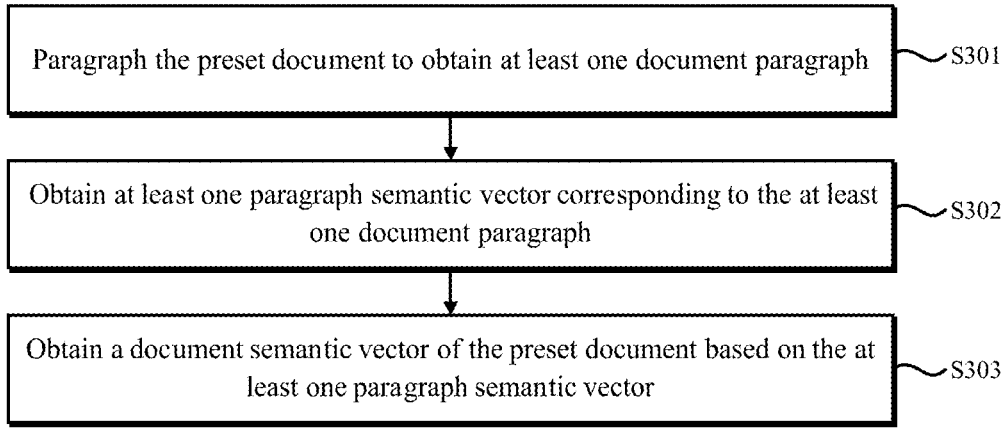
FIG. 3 is a flowchart of obtaining a document semantic vector according to some embodiments of the present disclosure.

In some embodiments, as shown in FIG. 3, obtaining the document semantic vector of each preset document in the document library includes: For each preset document in the document library, the following operations are performed: Step S301: Paragraph the preset document to obtain at least one document paragraph. Step S302: Obtain at least one paragraph semantic vector corresponding to the at least one document paragraph. Step S303: Obtain a document semantic vector of the preset document based on the at least one paragraph semantic vector.

Therefore, a semantic vector of each paragraph is obtained by paragraphing the document, so that the document semantic vector with richer semantic information can be obtained based on the paragraph semantic vector, and the accuracy of subsequent document recall and ranking can be further improved.

In some embodiments, the at least one paragraph semantic vector may be spliced to obtain the document semantic vector of the preset document.

In some embodiments, the at least one paragraph semantic vector may be superimposed to obtain the document semantic vector of the preset document.

In some embodiments, the document semantic vector may be associated with index information of the document, and stored in the document library together with the index information.

In some embodiments, ElasticSearch may be used as a data storage for the above text content and related structured fields obtained from the original document. Therefore, a quick response to correlation retrieval of the question text of the user can be implemented.

In some embodiments, the semantic vector may be stored by using milvus, and associated with the document content through the document index, to further improve recall efficiency of the semantic vector.

In some embodiments, to obtain the plurality of candidate documents from the document library of the specific field based on at least two of the semantic vector of the question text, the at least one piece of argument information, and the event category, document recall may be separately performed by using the semantic vector, by performing matching of the argument information, and by performing matching of the event category, and an intersection of document recall results is obtained, so that the recall results can be filtered by using the multi-dimensional information, and the accuracy of the recall results can be improved.

In some embodiments, to obtain the plurality of candidate documents from the document library of the specific field based on at least two of the semantic vector of the question text, the at least one piece of argument information, and the event category, preliminary document recall may be firstly performed based on the event category and the argument information, and then the plurality of candidate documents with highest semantic similarities are obtained from preliminary recall results based on the semantic vector. Therefore, through two-stage accurate recall, the scope of semantic retrieval can be greatly narrowed, and in addition, the most accurate answer information can be generated based on the most central documents.

Figure 4:
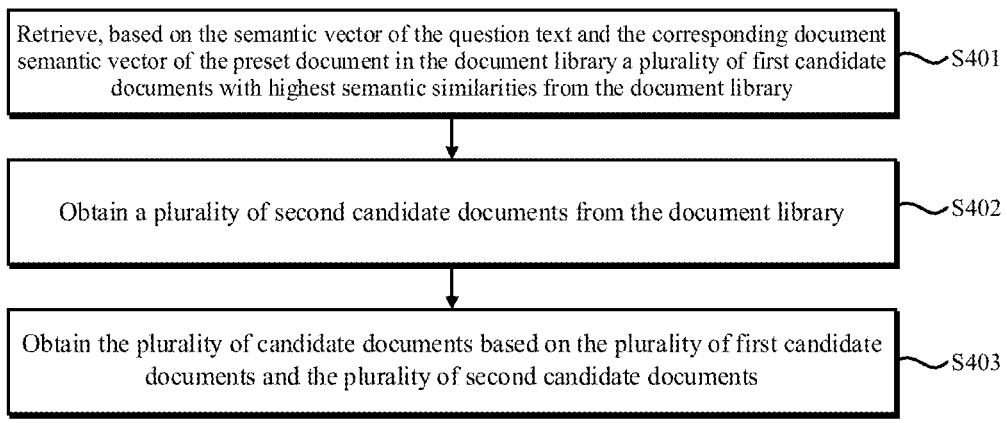
FIG. 4 is a flowchart of obtaining a plurality of candidate documents according to some embodiments of the present disclosure.

In some embodiments, as shown in FIG. 4, obtaining the plurality of candidate documents from the document library of the specific field based on at least two of the semantic vector of the question text, the at least one piece of argument information, and the event category includes the following steps: Step S401: Retrieve, based on the semantic vector of the question text and the corresponding document semantic vector of each preset document in the document library a plurality of first candidate documents with highest semantic similarities from the document library. Step S402: Obtain a plurality of second candidate documents from the document library, wherein each second candidate document of the plurality of second candidate documents meets at least one of following conditions: a document event category of the second candidate document matches the event category; and the second candidate document includes at least one piece of document argument information that matches one or more pieces of argument information in the at least one piece of argument information. Step S403: Obtain the plurality of candidate documents based on the plurality of first candidate documents and the plurality of second candidate documents.

Therefore, recall is separately performed based on the semantic vector, the time category, and/or the argument information, so that richer recall results can be obtained, and the accuracy of the subsequent target documents can be further improved.

In some embodiments, the plurality of second candidate documents may be recalled based on the event category or the argument information.

In some embodiments, the plurality of second candidate documents may be separately recalled based on the event category and the argument information, and an intersection of recall results is obtained, so that the recall results can be filtered by using the multi-dimensional information, and the accuracy of the recall results can be improved.

In some embodiments, the plurality of second candidate documents may be recalled based on both the event category and the argument information, to recall documents with both the event category and the argument information matched, so that the accuracy of recall results is further improved.

In some embodiments, to obtain the plurality of candidate documents based on the plurality of first candidate documents and the plurality of second candidate documents, an intersection of the plurality of first candidate documents and the plurality of second candidate documents may be obtained, so that recall results can be filtered by using the multi-dimensional information, and the accuracy of the recall results can be improved.

In some embodiments, to obtain the plurality of candidate documents based on the plurality of first candidate documents and the plurality of second candidate documents, a union of the plurality of first candidate documents and the plurality of second candidate documents may be obtained, and deduplication and preliminary ranking work (for example, ranking based on semantic correlations) may be further performed on the merged documents, to obtain a plurality of candidate documents ranked first.

In some embodiments, after the plurality of candidate documents are obtained, quality evaluation information for each candidate document in the plurality of candidate documents may be determined based on the event category.

In some embodiments, a corresponding quality evaluation policy may be set for each event category, and quality evaluation information (such as quality scores) for the document may be determined based on a quality evaluation policy corresponding to the question event. For example, the event category involved in the question of the user is business income. Since the user expects to obtain an answer from professional and standardized financial reports, and then from public sentiment with relatively high timeliness, quality scores for documents of research reports, financial reports, and the public sentiment may be respectively set to 70, 90, and 80. Therefore, the quality evaluation information for each candidate document is determined based on the event category of the question.

Figure 5:
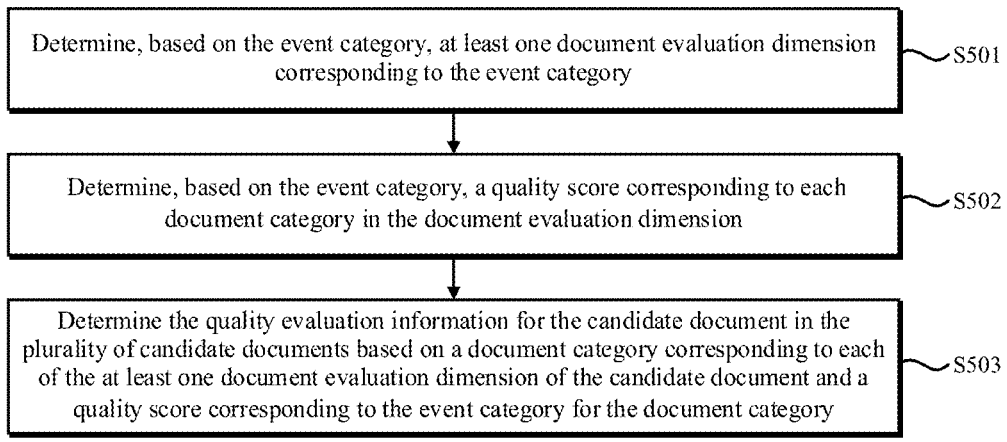
FIG. 5 is a flowchart of determining quality evaluation information for a candidate document according to some embodiments of the present disclosure.

In some embodiments, as shown in FIG. 5, the determining the quality evaluation information for each candidate document in the plurality of candidate documents based on the event category includes the following steps: Step S501: Determine, based on the event category, at least one document evaluation dimension corresponding to the event category, wherein the at least one document evaluation dimension corresponds to at least one aspect of document quality, wherein each document evaluation dimension of the at least one document evaluation dimension corresponds to a plurality of document categories, and wherein the plurality of document categories are determined based on an aspect of document quality that a corresponding document evaluation dimension focuses on. Step S502: Determine, based on the event category, a quality score corresponding to each document category of the plurality of document categories of each document evaluation dimension. Step S503: Determine the quality evaluation information for each candidate document in the plurality of candidate documents based on a document category corresponding to each of the at least one document evaluation dimension of the candidate document and a quality score corresponding to the event category for the document category.

Therefore, the evaluation dimension of the document is determined based on the event category of the question text, the quality score for the document category corresponding to each document in each document evaluation dimension is then determined based on the event category, and the quality evaluation information for the document is determined based on the quality score in each document evaluation dimension, so that the document can be evaluated more in line with user requirements based on the event category of the question text of the user, and the accuracy of subsequent ranking can be improved.

In some embodiments, one event category of the question text may correspond to one or more quality evaluation dimensions, and for each evaluation dimension, a quality score corresponding to the event category may be determined for the document.

In some embodiments, the event category concerning the question text of the user may be policy information, and the event category may separately correspond to two document evaluation dimensions used to evaluate document quality: authority and timeliness. For the authority evaluation dimension, documents may be classified based on document resources, for example, classified into research reports, financial reports, and public sentiment, and higher authority quality scores are set for the news and public sentiment. For the timeliness evaluation dimension, documents may be classified based on publication time of the documents, and higher timeliness quality scores are set for documents published more recently.

In some embodiments, for each candidate document, one or more quality scores may be obtained based on the above manner. For a plurality of quality scores, different weights may be further set for quality evaluation dimensions based on the question event category, and each quality score is weighted, so that a comprehensive quality score for the candidate document is obtained to serve as quality evaluation information for the candidate document.

In some embodiments, the determining the at least one target document from the plurality of candidate documents based on the quality evaluation information of each candidate document and a correlation between each candidate document and the question text may include: determining a comprehensive score for each candidate document in the plurality of candidate documents based on the quality evaluation information of each candidate document and the correlation between each candidate document and the question text; and determining, as the at least one target document, at least one candidate document whose comprehensive score meets a preset condition in the plurality of candidate documents.

Therefore, a comprehensive score for each candidate document can be determined by comprehensively considering the comprehensive quality score and the correlation between the document content and the question text, and then the candidate documents are reordered and the target document is determined, so that the target document with better quality and higher correlation with the question text can be obtained.

In some embodiments, the semantic correlation between the candidate document and the question text may be weighted based on the comprehensive quality score, to obtain the comprehensive score for each candidate document.

In some embodiments, the quality evaluation information may include a quality score corresponding to each of at least one document evaluation dimension of a corresponding candidate document. For example, for quality evaluation information for a plurality of document evaluation dimensions, quality scores for the dimensions may be organized into feature vectors in a preset order.

Figure 6:
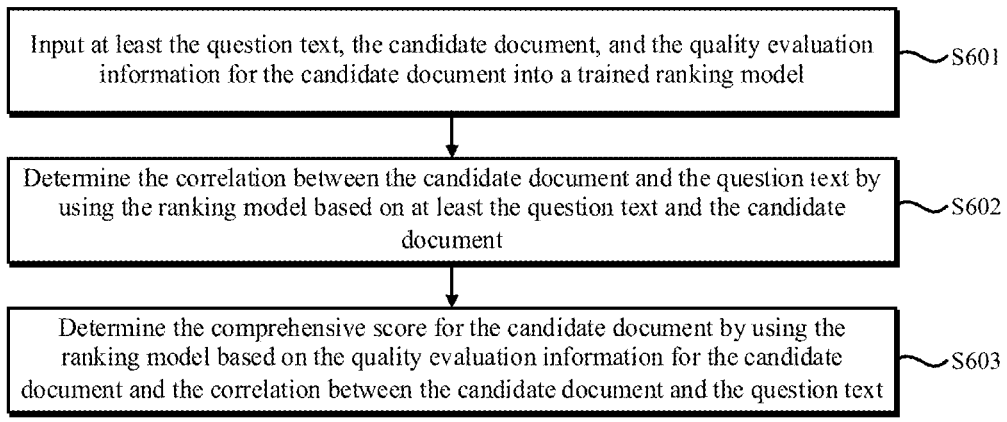
FIG. 6 is a flowchart of determining a comprehensive score for a candidate document according to some embodiments of the present disclosure.

In some embodiments, as shown in FIG. 6, the determining the comprehensive score for each candidate document in the plurality of candidate documents based on the quality evaluation information of each candidate document and the correlation between each candidate document and the question text may include performing, for each candidate document in the plurality of candidate documents, following operations: Step S601: Input at least the question text, the candidate document, and the quality evaluation information for the candidate document into a trained ranking model. Step S602: Determine the correlation between the candidate document and the question text by using the ranking model based on at least the question text and the candidate document. Step S603: Determine the comprehensive score for the candidate document by using the ranking model based on the quality evaluation information for the candidate document and the correlation between the candidate document and the question text.

Therefore, the question text, related information of the document, and the quality evaluation information for each document relative to the current question text are input into the ranking model, so that the correlation information and quality information of the document can be comprehensively considered, and a ranking result that is more accurate and more in line with user requirements can be obtained.

In some embodiments, the quality evaluation information (such as the above comprehensive quality score or the above feature vector for quality) as well as the question text and the document content of each candidate document may be input into a ranking model that is pre-trained for fine-ranking, and the correlation and document quality may be comprehensively evaluated by using this model, to output the comprehensive score for each candidate document.

In some embodiments, the question text, and event category information and argument information of the candidate document may also be further input into the above ranking model, to further improve a ranking effect of the model.

In some embodiments, the at least one candidate document whose comprehensive score meets the preset condition in the plurality of candidate documents is determined as the at least one target document, to serve as the answer information used to answer the question text. The preset condition may be that a comprehensive score is greater than a preset threshold. One or more documents whose comprehensive scores are the highest may be determined as target documents, or one or more documents whose comprehensive scores are the highest and are greater than a preset threshold may be determined as target documents.

In some embodiments, obtaining, based on the at least one target document, the answer information used to answer the question text may include: organizing the question text and the at least one target document into an instruction text based on a preset instruction template; and inputting the instruction text into an answer information generation model to obtain the answer information output by the answer information generation model.

Therefore, the question text and the target document are integrated into the instruction text, and the instruction text is input into the answer information generation model, so that the readability of the answer information can be further improved, and user experience can be optimized.

In some embodiments, for example, the preset instruction template may be "Please try to avoid generating irrelevant, inconsistent, or semantically repetitive answers" or "Please comprehensively refer to search results related to the question and answer the question [question text] clearly, smoothly and in detail in combination with found documents [target document 1], [target document 2], [target document 3], and [target document 4]".

In some embodiments, the answer information generation model may be a knowledge-enhanced large language model (such as ERNIE bot) for dialogs, and the answer information generation model is obtained through training by using massive knowledge resources and dialog data. Using this type of model as the answer information generation model can directly generate answer information for dialog information of logical reasoning, common sense, and image production in addition to directly processing dialog information of small talks, which can further improve generation efficiency while generating answer information with higher quality.

Figure 7:
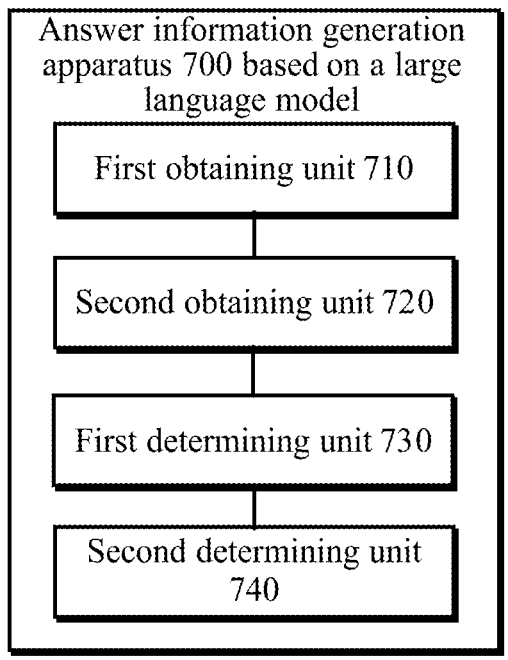
FIG. 7 is a block diagram of a structure of an answer information generation apparatus based on a large language model according to some embodiments of the present disclosure.

In some embodiments, as shown in FIG. 7, an answer information generation apparatus 700 based on a large language model is provided, including:

a first obtaining unit 710 configured to obtain, in response to receiving a question text from a user, a semantic vector of the question text and event information related to a specific field, wherein the event information includes an event category concerning the question text and at least one piece of argument information in the question text;

a second obtaining unit 720 configured to obtain a plurality of candidate documents from a document library of the specific field based on at least two of the semantic vector of the question text, the at least one piece of argument information and the event category;

a first determining unit 730 configured to determine quality evaluation information for each candidate document in the plurality of candidate documents based on the event category; and a second determining unit 740 configured to determine at least one target document from the plurality of candidate documents based on the quality evaluation information of each candidate document and a correlation between each candidate document and the question text, to obtain, based on the at least one target document, answer information used to answer the question text.

The operations performed by the unit 710 to the unit 740 in the above answer information generation apparatus 700 based on the large language model are similar to the operations of step S201 to step S204 in the above answer information generation method based on the large language model, and details are not described herein again.

In some embodiments, the first determining unit may include: a first determining subunit configured to determine, based on the event category, at least one document evaluation dimension corresponding to the event category, wherein the at least one document evaluation dimension corresponds to at least one aspect of document quality, wherein each document evaluation dimension of the at least one document evaluation dimension corresponds to a plurality of document categories, and wherein the plurality of document categories are determined based on an aspect of document quality that a corresponding document evaluation dimension focuses on; a second determining subunit configured to determine, based on the event category, a quality score corresponding to each document category of the plurality of document categories of each document evaluation dimension; and a third determining subunit configured to determine the quality evaluation information for each candidate document in the plurality of candidate documents based on a document category corresponding to each of the at least one document evaluation dimension of the candidate document and a quality score corresponding to the event category for the document category.

In some embodiments, the second determining unit may include: a fourth determining subunit configured to determine a comprehensive score for each candidate document in the plurality of candidate documents based on the quality evaluation information of each candidate document and the correlation between each candidate document and the question text; and a fifth determining subunit configured to determine, as the at least one target document, at least one candidate document whose comprehensive score meets a preset condition in the plurality of candidate documents.

In some embodiments, the quality evaluation information may include a quality score corresponding to each of at least one document evaluation dimension of a corresponding candidate document, and the fourth determining subunit may be further configured to: perform, for each candidate document in the plurality of candidate documents, following operations: inputting at least the question text, the candidate document, and the quality evaluation information for the candidate document into a trained ranking model; determining the correlation between the candidate document and the question text by using the ranking model based on at least the question text and the candidate document; and determining the comprehensive score for the candidate document by using the ranking model based on the quality evaluation information for the candidate document and the correlation between the candidate document and the question text.

In some embodiments, the document library includes a plurality of preset documents, a preset document in the plurality of preset documents may include a corresponding document semantic vector, at least one document event category, and at least one piece of document argument information, and the second obtaining unit may include: a first obtaining subunit configured to retrieve, based on the semantic vector of the question text and the corresponding document semantic vector of each preset document in the document library a plurality of first candidate documents with highest semantic similarities from the document library; a second obtaining subunit configured to obtain a plurality of second candidate documents from the document library, wherein each second candidate document of the plurality of second candidate documents meets at least one of following conditions: a document event category of the second candidate document matches the event category; and the second candidate document includes at least one piece of document argument information that matches one or more pieces of argument information in the at least one piece of argument information; and a third obtaining subunit configured to obtain the plurality of candidate documents based on the plurality of first candidate documents and the plurality of second candidate documents.

In some embodiments, obtaining the document semantic vector of each preset document in the document library may include: performing, for each preset document in the document library, following operations: paragraphing the preset document to obtain at least one document paragraph; obtaining at least one paragraph semantic vector corresponding to the at least one document paragraph; and obtaining the document semantic vector of the preset document based on the at least one paragraph semantic vector.

In some embodiments, the second determining unit may include: an organizing subunit configured to organize the question text and the at least one target document into an instruction text based on a preset instruction template; and a fourth obtaining subunit configured to input the instruction text into an answer information generation model to obtain the answer information output by the answer information generation model.

According to some embodiments of the present disclosure, an electronic device, a readable storage medium, and a computer program product are further provided.

Figure 8:
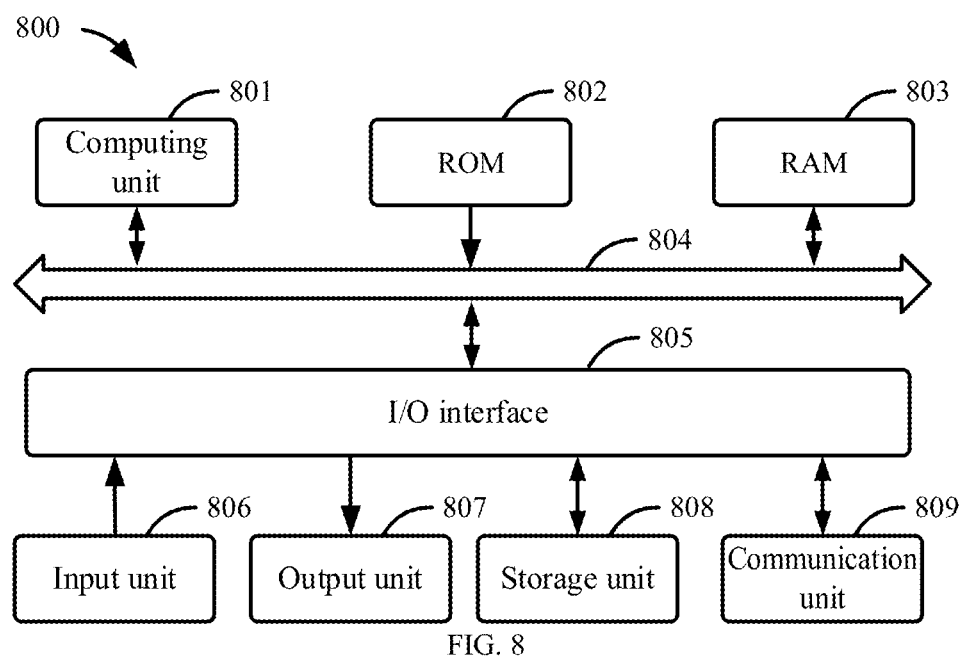
FIG. 8 is a block diagram of a structure of an example electronic device that can be used to implement embodiments of the present disclosure.

Referring to FIG. 8, a block diagram of a structure of an electronic device 800 that can serve as a server or a client of the present disclosure is now described. The electronic device is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 8, the electronic device 800 includes a computing unit 801. The computing unit may perform various appropriate actions and processing according to a computer program stored in a read-only memory (ROM) 802 or a computer program loaded from a storage unit 808 to a random access memory (RAM) 803. The RAM 803 may further store various programs and data required for the operation of the electronic device 800. The computing unit 801, the ROM 802, and the RAM 803 are connected to each other through a bus 804. An input/output (I/O) interface 805 is also connected to the bus 804.

A plurality of components in the electronic device 800 are connected to the I/O interface 805, including: an input unit 806, an output unit 807, the storage unit 808, and a communication unit 809. The input unit 806 may be any type of device capable of entering information to the electronic device 800. The input unit 806 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 807 may be any type of device capable of presenting information, and may include, but is not limited to, a display, a speaker, a video/audio output terminal, a vibrator, and/or a printer. The storage unit 808 may include, but is not limited to, a magnetic disk and an optical disk. The communication unit 809 allows the electronic device 800 to exchange information/data with other devices via a computer network such as the Internet and/or various telecommunications networks, and may include, but is not limited to, a modem, a network interface card, an infrared communications device, a wireless communications transceiver, and/or a chipset, for example, a Bluetooth device, an 802.11 device, a Wi-Fi device, a WiMax device, or a cellular communication device.

The computing unit 801 may be various general-purpose and/or special-purpose processing components with processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 801 performs various methods and processing described above, such as the above answer information generation method based on the large language model. For example, in some embodiments, the above answer information generation method based on the large language model may be implemented as a computer software program, which is tangibly contained in a machine-readable medium, such as the storage unit 808. In some embodiments, a part or all of the computer program may be loaded and/or installed onto the electronic device 800 via the ROM 802 and/or the communication unit 809. When the computer program is loaded onto the RAM 803 and executed by the computing unit 801, one or more steps of the above answer information generation method based on the large language model can be performed. Alternatively, in other embodiments, the computing unit 801 may be configured, by any other suitable means (for example, by means of firmware), to perform the above answer information generation method based on the large language model.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, so that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), and the Internet.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. An answer information generation method based on a large language model, comprising:
    obtaining, in response to receiving a question text from a user, a semantic vector of the question text and event information related to a specific field, wherein the event information includes an event category concerning the question text and at least one piece of argument information in the question text;
    obtaining a plurality of candidate documents from a document library of the specific field based on at least two of the semantic vector of the question text, the at least one piece of argument information and the event category;
    determining, based on the event category, at least one document evaluation dimension corresponding to the event category, wherein:
        the at least one document evaluation dimension corresponds to at least one aspect of document quality,
        each document evaluation dimension of the at least one document evaluation dimension corresponds to a plurality of document categories, and
        the plurality of document categories are determined based on an aspect of document quality that a corresponding document evaluation dimension focuses on;
    determining, based on the event category, a quality score corresponding to each document category of the plurality of document categories of each document evaluation dimension;
    determining quality evaluation information for each candidate document in the plurality of candidate documents based on a document category corresponding to each of the at least one document evaluation dimension of the candidate document and a quality score corresponding to the event category for the document category;
    and
    determining at least one target document from the plurality of candidate documents based on the quality evaluation information of each candidate document and a correlation between each candidate document and the question text, to obtain, based on the at least one target document, answer information used to answer the question text.

2. The method according to claim 1, wherein the determining the at least one target document from the plurality of candidate documents based on the quality evaluation information of each candidate document and a correlation between each candidate document and the question text comprises:
    determining a comprehensive score for each candidate document in the plurality of candidate documents based on the quality evaluation information of each candidate document and the correlation between each candidate document and the question text; and
    determining, as the at least one target document, at least one candidate document whose comprehensive score meets a preset condition in the plurality of candidate documents.

3. The method according to claim 2, wherein the quality evaluation information includes a quality score corresponding to each of at least one document evaluation dimension of a corresponding candidate document, and wherein the determining the comprehensive score for each candidate document in the plurality of candidate documents based on the quality evaluation information of each candidate document and the correlation between each candidate document and the question text comprises:
    performing, for each candidate document in the plurality of candidate documents, following operations:
        inputting at least the question text, the candidate document, and the quality evaluation information for the candidate document into a trained ranking model;
        determining the correlation between the candidate document and the question text by using the ranking model based on at least the question text and the candidate document; and
    determining the comprehensive score for the candidate document by using the ranking model based on the quality evaluation information for the candidate document and the correlation between the candidate document and the question text.

4. The method according to claim 3, wherein the document library includes a plurality of preset documents, wherein each preset document of the plurality of preset documents includes a corresponding document semantic vector, at least one document event category and at least one piece of document argument information, and wherein the obtaining the plurality of candidate documents from the document library of the specific field based on at least two of the semantic vector of the question text, the at least one piece of argument information, and the event category comprises:

retrieving, based on the semantic vector of the question text and the corresponding document semantic vector of each preset document in the document library a plurality of first candidate documents with highest semantic similarities from the document library;

obtaining a plurality of second candidate documents from the document library, wherein each second candidate document of the plurality of second candidate documents meets at least one of following conditions: a document event category of the second candidate document matches the event category; and the second candidate document includes at least one piece of document argument information that matches one or more pieces of argument information in the at least one piece of argument information; and obtaining the plurality of candidate documents based on the plurality of first candidate documents and the plurality of second candidate documents.

5. The method according to claim 4, wherein obtaining the document semantic vector of each preset document in the document library comprises:

performing, for each preset document in the document library, following operations:
paragraphing the preset document to obtain at least one document paragraph;
obtaining at least one paragraph semantic vector corresponding to the at least one document paragraph; and
obtaining the document semantic vector of the preset document based on the at least one paragraph semantic vector.

6. The method according to claim 5, wherein obtaining, based on the at least one target document, the answer information used to answer the question text comprises:

organizing the question text and the at least one target document into an instruction text based on a preset instruction template; and
inputting the instruction text into an answer information generation model to obtain the answer information by the answer information generation model.

7. An electronic device, comprising:
one or more processors; and
a memory storing one or more programs configured to be executed by the one or more processors, the one or more programs comprising instructions for:
obtaining, in response to receiving a question text from a user, a semantic vector of the question text and event information related to a specific field, wherein the event information includes an event category concerning the question text and at least one piece of argument information in the question text;
obtaining a plurality of candidate documents from a document library of the specific field based on at least two of the semantic vector of the question text, the at least one piece of argument information and the event category;
determining, based on the event category, at least one document evaluation dimension corresponding to the event category, wherein:
the at least one document evaluation dimension corresponds to at least one aspect of document quality,
each document evaluation dimension of the at least one document evaluation dimension corresponds to a plurality of document categories, and the plurality of document categories are determined based on an aspect of document quality that a corresponding document evaluation dimension focuses on;

determining, based on the event category, a quality score corresponding to each document category of the plurality of document categories of each document evaluation dimension; and determining quality evaluation information for each candidate document in the plurality of candidate documents based on a document category corresponding to each of the at least one document evaluation dimension of the candidate document and a quality score corresponding to the event category for the document category;

determining at least one target document from the plurality of candidate documents based on the quality evaluation information of each candidate document and a correlation between each candidate document and the question text, to obtain, based on the at least one target document, answer information used to answer the question text.

8. The electronic device according to claim 7, wherein the determining the at least one target document from the plurality of candidate documents based on the quality evaluation information of each candidate document and a correlation between each candidate document and the question text comprises:

determining a comprehensive score for each candidate document in the plurality of candidate documents based on the quality evaluation information of each candidate document and the correlation between each candidate document and the question text; and determining, as the at least one target document, at least one candidate document whose comprehensive score meets a preset condition in the plurality of candidate documents.

9. The electronic device according to claim 8, wherein the quality evaluation information includes a quality score corresponding to each of at least one document evaluation dimension of a corresponding candidate document, and wherein the determining the comprehensive score for each candidate document in the plurality of candidate documents based on the quality evaluation information of each candidate document and the correlation between each candidate document and the question text comprises:

performing, for each candidate document in the plurality of candidate documents, following operations:
inputting at least the question text, the candidate document, and the quality evaluation information for the candidate document into a trained ranking model;
determining the correlation between the candidate document and the question text by using the ranking model based on at least the question text and the candidate document; and
determining the comprehensive score for the candidate document by using the ranking model based on the quality evaluation information for the candidate document and the correlation between the candidate document and the question text.

10. The electronic device according to claim 9, wherein the document library includes a plurality of preset documents, wherein each preset document of the plurality of preset documents includes a corresponding document semantic vector, at least one document event category and at least one piece of document argument information, and wherein the obtaining the plurality of candidate documents from the document library of the specific field based on at least two of the semantic vector of the question text, the at least one piece of argument information, and the event category comprises:
- retrieving, based on the semantic vector of the question text and the corresponding document semantic vector of each preset document in the document library a plurality of first candidate documents with highest semantic similarities from the document library;
- obtaining a plurality of second candidate documents from the document library, wherein each second candidate document of the plurality of second candidate documents meets at least one of following conditions: a document event category of the second candidate document matches the event category; and the second candidate document includes at least one piece of document argument information that matches one or more pieces of argument information in the at least one piece of argument information; and
- obtaining the plurality of candidate documents based on the plurality of first candidate documents and the plurality of second candidate documents.

11. The electronic device according to claim 10, wherein obtaining the document semantic vector of each preset document in the document library comprises:
- performing, for each preset document in the document library, following operations:
  - paragraphing the preset document to obtain at least one document paragraph;
  - obtaining at least one paragraph semantic vector corresponding to the at least one document paragraph; and
  - obtaining the document semantic vector of the preset document based on the at least one paragraph semantic vector.

12. The electronic device according to claim 11, wherein obtaining, based on the at least one target document, the answer information used to answer the question text comprises:
- organizing the question text and the at least one target document into an instruction text based on a preset instruction template; and
- inputting the instruction text into an answer information generation model to obtain the answer information by the answer information generation model.

13. A non-transitory computer-readable storage medium, storing one or more programs comprising instructions that, when executed by one or more processors of a computing device, cause the computing device to perform operations comprising:
- obtaining, in response to receiving a question text from a user, a semantic vector of the question text and event information related to a specific field, wherein the event information includes an event category concerning the question text and at least one piece of argument information in the question text;
- obtaining a plurality of candidate documents from a document library of the specific field based on at least two of the semantic vector of the question text, the at least one piece of argument information and the event category;
- determining, based on the event category, at least one document evaluation dimension corresponding to the event category, wherein:
  - the at least one document evaluation dimension corresponds to at least one aspect of document quality, each document evaluation dimension of the at least one document evaluation dimension corresponds to a plurality of document categories, and
  - the plurality of document categories are determined based on an aspect of document quality that a corresponding document evaluation dimension focuses on;
- determining, based on the event category, a quality score corresponding to each document category of the plurality of document categories of each document evaluation dimension; and
- determining quality evaluation information for each candidate document in the plurality of candidate documents based on a document category corresponding to each of the at least one document evaluation dimension of the candidate document and a quality score corresponding to the event category for the document category;
- determining at least one target document from the plurality of candidate documents based on the quality evaluation information of each candidate document and a correlation between each candidate document and the question text, to obtain, based on the at least one target document, answer information used to answer the question text.

14. The non-transitory computer-readable storage medium according to claim 13, wherein the determining the at least one target document from the plurality of candidate documents based on the quality evaluation information of each candidate document and a correlation between each candidate document and the question text comprises:
- determining a comprehensive score for each candidate document in the plurality of candidate documents based on the quality evaluation information of each candidate document and the correlation between each candidate document and the question text; and
- determining, as the at least one target document, at least one candidate document whose comprehensive score meets a preset condition in the plurality of candidate documents.

15. The non-transitory computer-readable storage medium according to claim 14, wherein the quality evaluation information includes a quality score corresponding to each of at least one document evaluation dimension of a corresponding candidate document, and wherein the determining the comprehensive score for each candidate document in the plurality of candidate documents based on the quality evaluation information of each candidate document and the correlation between each candidate document and the question text comprises:
- performing, for each candidate document in the plurality of candidate documents, following operations:
  - inputting at least the question text, the candidate document, and the quality evaluation information for the candidate document into a trained ranking model;
  - determining the correlation between the candidate document and the question text by using the ranking model based on at least the question text and the candidate document; and
  - determining the comprehensive score for the candidate document by using the ranking model based on the quality evaluation information for the candidate document and the correlation between the candidate document and the question text.

16. The non-transitory computer-readable storage medium according to claim 15, wherein the document library includes a plurality of preset documents, wherein each preset document of the plurality of preset documents includes a corresponding document semantic vector, at least one document event category and at least one piece of document argument information, and wherein the obtaining the plurality of candidate documents from the document library of the specific field based on at least two of the semantic vector of the question text, the at least one piece of argument information, and the event category comprises:

retrieving, based on the semantic vector of the question text and the corresponding document semantic vector of each preset document in the document library a plurality of first candidate documents with highest semantic similarities from the document library;

obtaining a plurality of second candidate documents from the document library, wherein each second candidate document of the plurality of second candidate documents meets at least one of following conditions: a document event category of the second candidate document matches the event category; and the second candidate document includes at least one piece of document argument information that matches one or more pieces of argument information in the at least one piece of argument information; and obtaining the plurality of candidate documents based on the plurality of first candidate documents and the plurality of second candidate documents.

17. The non-transitory computer-readable storage medium according to claim 16, wherein obtaining the document semantic vector of each preset document in the document library comprises:

performing, for each preset document in the document library, following operations:

paragraphing the preset document to obtain at least one document paragraph;

obtaining at least one paragraph semantic vector corresponding to the at least one document paragraph; and obtaining the document semantic vector of the preset document based on the at least one paragraph semantic vector.

\* \* \* \* \*